(12) United States Patent
He et al.

(10) Patent No.: US 11,032,999 B2
(45) Date of Patent: Jun. 15, 2021

(54) ANIMAL CAGE

(71) Applicant: Dalian Jinyu Metal Product Co. Ltd., Dalian (CN)

(72) Inventors: Qingping He, Dalian (CN); Xianping Zhu, Dalian (CN); Jiang Li, Dalian (CN)

(73) Assignee: Dalian Jinyu Metal Product Co. Ltd., Dalian (CN)

( * ) Notice: Subject to any disclaimer, the term of this patent is extended or adjusted under 35 U.S.C. 154(b) by 106 days.

(21) Appl. No.: 15/375,608

(22) Filed: Dec. 12, 2016

(65) Prior Publication Data

US 2017/0295748 A1    Oct. 19, 2017

Related U.S. Application Data

(60) Provisional application No. 62/322,744, filed on Apr. 14, 2016.

(51) Int. Cl.
*A01K 1/00* (2006.01)
*A01K 1/03* (2006.01)

(52) U.S. Cl.
CPC .................... *A01K 1/034* (2013.01)

(58) Field of Classification Search
CPC .... A01K 1/0017; A01K 1/0035; A01K 1/034; A01K 1/0005; A01K 1/0034; A01K 13/00; A01K 1/029; A01K 1/0245; A01K 1/0114
USPC ....... 119/452, 472, 474, 481, 498, 499, 501, 119/502, 512, 514, 524
See application file for complete search history.

(56) References Cited

U.S. PATENT DOCUMENTS

| | | | | |
|---|---|---|---|---|
| 611,913 | A | * | 10/1898 | Kees ........................ E04H 17/04 256/45 |
| 2,501,642 | A | * | 3/1950 | Mont Davidson ... A01K 31/002 217/47 |
| 3,556,058 | A | * | 1/1971 | Smiler ..................... A01K 1/03 119/474 |

(Continued)

FOREIGN PATENT DOCUMENTS

| | | |
|---|---|---|
| CN | 104521790 | 4/2015 |
| CN | 204259588 | 4/2015 |

(Continued)

OTHER PUBLICATIONS https://www.petstreetmall.com/Ovation-trainer-double%20%E2%80%93door%20crate/11055/5523/details.html; 2014.*

*Primary Examiner* — Ebony E Evans
(74) *Attorney, Agent, or Firm* — Brient IP Law, LLC

(57) ABSTRACT

A cage has a front, a rear, a first side, a second side, a top, and a bottom panel and at least one door formed through and operatively coupled to one of the panels. The cage further has an integrated handle and lock mechanism coupled to the at least one door. The lock has one or more catches that engage one of a plurality of horizontal bars or a plurality of vertical bars that form the panel containing the door. The integrated handle and the lock is rotatable between (1) a first locked position where the handle is parallel to the door and the catches engage with one of the horizontal or vertical bars that form the panel coupled to the door, and (2) second open position where the handle is no longer parallel to the surface and catches disengage from the horizontal or vertical bar.

19 Claims, 11 Drawing Sheets

(56) References Cited

U.S. PATENT DOCUMENTS

| | | | |
|---|---|---|---|
| 6,883,463 B2 * | 4/2005 | Link | A01K 1/0245 |
| | | | 119/453 |
| D673,737 S * | 1/2013 | Cantwell | D30/114 |
| 9,339,006 B1 * | 5/2016 | Eby | A01K 1/034 |
| D770,692 S * | 11/2016 | Cantwell | D30/119 |
| 2014/0109839 A1 * | 4/2014 | Cantwell | A01K 1/034 |
| | | | 119/481 |
| 2018/0249675 A1 * | 9/2018 | Fleming | A01K 1/034 |
| 2019/0029216 A1 * | 1/2019 | Volin | A01K 1/029 |

FOREIGN PATENT DOCUMENTS

| | | | |
|---|---|---|---|
| CN | 204259589 | 4/2015 | |
| CN | 204291964 | 4/2015 | |
| CN | 204317224 | 5/2015 | |
| CN | 204377639 | 6/2015 | |
| WO | WO-2016162730 A1 * | 10/2016 | A01K 1/034 |

\* cited by examiner

ANIMAL CAGE

CROSS-REFERENCE TO RELATED APPLICATIONS

This patent application claims priority to U.S. Provisional Patent Application No. 62/322,744, entitled "Animal Cage", filed Apr. 14, 2016, the entire disclosure of which is hereby incorporated by reference in its entirety.

BACKGROUND

With the continuous improvement of people's living standards, in the city more and more pet owners, especially dog owners increase every year. As such, demand for pet cages has increased. Pet cages not only need to be functional but they must also be ascetic and decorative. The present pet cages address the problems at hand by providing new and improved pet cages.

SUMMARY OF THE INVENTION

In general, in various embodiments, an animal cage comprises a front panel, a rear panel, a first side panel, a second side panel, a top panel, and a bottom panel. The cage further comprises at least one door that is operatively coupled to one of the front panel, the rear panel, the first side panel, the second side panel, or the top panel. The animal cage further comprises an integrated handle and lock mechanism that is coupled to the at least one door. The integrated handle and locking mechanism comprises: (1) a handle; and (2) a lock coupled to the handle. The lock comprises one or more catches (e.g., hooks).

The integrated handle and the lock mechanism is rotatable between a first position and a second position. In the first position, the handle is substantially parallel to a surface defined by the at least one door and the one or more catches engage with at least one of the horizontal bars or at least one of the vertical bars that form one of the front panel, the rear panel, the first side panel, the second side panel, or the top panel in which the at least one door is operatively coupled to. In the second position, the handle is no longer parallel to the surface defined by the door and the one or more catches disengage from the at least one of the horizontal bars or the at least one of the vertical bars that form the one of the front panel, the rear panel, the first side panel, the second side panel, or the top panel in which the at least one door is operatively coupled to.

In various embodiments, the at least one door of the animal cage is both pivotally and slidably coupled to the one of the front panel, the rear panel, the first side panel, the second side panel, or the top panel along a first side edge of the at least one door. In particular embodiments, the at least one door comprises that least one opening formed in a second side edge of the at least one door and the handle is pivotally coupled adjacent a top edge of the at least one door.

The animal cage further comprises at least one latch coupled to the one of the front panel, the rear panel, the first side panel, the second side panel, or the top panel such that, when the integrated handle and locking mechanism is moved from the first locked position into the second unlocked position, the at least one door is moveable between the following positions: (1) a first closed position in which the at least one latch does not align with the at least one opening formed in the second side edge of the at least one door and the door will not rotate with respect to the one of the front panel, rear panel, first side panel, second side panel or top panel; (2) a second intermediate position in which the at least one latch aligns with the at least one opening formed in the second side edge of the at least one door; and (3) a third open position in which the at least one door is in an open position. The at least one door of the animal cage, in various embodiments, is slidable between the first closed position and the second intermediate position and the at least one door is rotatable between the second intermediate position and the third open position.

In particular embodiments, the handle of the animal cage is formed by bending an elongated rod so that a first end of the rod is proximate to a second end of the rod. The first end of the rod is then bent to form a first catch and the second end of the rod is bent to form a second catch.

The animal cage at least one door is formed from a plurality of horizontal bars coupled to a plurality of vertical bars. One or more ends of the plurality of horizontal bars along the first side edge of the at least one door are bent around a first vertical bar of the one of the front panel, the rear panel, the first side panel, the second side panel, or the top panel to form a loop so that the at least one door is both slidable and rotatable with respect to the one of the front panel, the rear panel, the first side panel, the second side panel, or the top panel.

In various embodiments, a bottom edge of the first side panel is rotatably coupled to a first edge of the bottom panel, a top edge of the first side panel is rotatably coupled to a first edge of the top panel, a bottom edge of the second side panel is rotatably coupled to an opposite second edge of the bottom panel, a top edge of the second side panel is rotatably coupled to an opposite second edge of the top panel, a bottom edge of the front panel is rotatably coupled to a third side edge of the bottom panel that is intermediate the first edge and the second edge of the bottom panel, and a bottom edge of the back panel is rotatably coupled to a fourth side edge of the bottom panel that is intermediate the first edge and the second edge of the bottom panel. In various embodiments in the arrangement just described, the first side panel, the second side panel, the front panel, the rear panel, the top panel, and the bottom panel all define an inside space of the animal cage.

In particular embodiments, the animal cage further comprises one or more couplings that are each being integrally formed with at least one of the first side panel, the second side panel, and the top panel. In some embodiments, the one or more couplings are integrally formed from one of the plurality of horizontal bars or one of the plurality of vertical bars that form the first side panel, the second side panel, or the top panel. The animal cage may further comprise: (1) a first coupling formed at a front edge of the first side panel, where the first coupling defines a hook that bends toward the inside space of the animal cage; and (2) a second coupling formed at an opposite back edge of the first side panel, where the first coupling defines a hook that bends toward the inside space of the animal cage. In various embodiments, the first coupling is formed by bending an end of one of the plurality of horizontal bars that extends past the front edge of the first side panel into a hook shaped end, the second coupling is formed by bending an end of one of the plurality of horizontal bars that extends past the rear edge of the first side panel into a hook shaped end, the first coupling is configured to engage with a first one of the plurality of vertical bars that form the front panel adjacent a first side edge of the front panel, and the second coupling is configured to engage with a first one of the plurality of vertical bars that form the rear panel adjacent a first side edge of the rear panel.

In particular embodiments, the at least one door of the animal cage is slidably coupled to the one of the front panel, the rear panel, the first side panel, the second side panel, or the top panel and the handle is pivotally coupled adjacent an edge of the at least one door. In various embodiments, when the integrated handle and the locking mechanism are moved from the first position into the second position, the at least one door is moveable between: (1) a first closed position; and (2) a second open position.

In another embodiments, an animal cage comprises (1) a front panel, a rear panel, a first side panel, a second side panel, a top panel, and a bottom panel; (2) at least one door operatively coupled to one of the front panel, rear panel, first side panel, second side panel or top panel; and (3) at least one latch coupled to the one of the front panel, rear panel, first side panel, second side panel or top panel to which the at least one door is coupled. In various embodiments, each of the front panel, rear panel, first side panel, and second side panel are formed from a plurality of horizontal bars and a plurality of vertical bars. In some embodiments, the at least one door is both pivotally and slidably coupled to the one panel to which the at least one door is coupled along a first side edge of the at least one door, and the at least one door comprises at least one opening formed in a second side edge of the at least one door. In particular embodiments, the at least one door is moveable between: (a) a first closed position in which the at least one latch does not align with the at least one opening formed in the second side edge of the at least one door and the at least one door will not rotate with respect to the one panel to which it is coupled, (b) a second intermediate position in which the at least one latch aligns with the at least one opening formed in the second side edge of the at least one door; and (c) a third open position in which the at least one door is in an open position.

In various embodiments, the at least one door is slidable between the first closed position and the second intermediate position, and the at least one door is rotatable between the second intermediate position and the third open position. In some embodiments, the animal cage further comprises an integrated handle and lock mechanism coupled to the at least one door; wherein the integrated handle and lock mechanism is rotatable between: (1) a first locked position in which the handle is substantially parallel to a surface defined by the at least one door and the one or more catches engage with at least one of the horizontal bars or at least one of the vertical bars that form the one panel to which the at least one door is coupled; and (2) a second unlocked position in which the handle is no longer parallel to the surface defined by the at least one door, and the one or more catches disengage from the at least one of the horizontal bars or the at least one of the vertical bars that form the one panel to which the at least one door is coupled.

In particular embodiments, the handle and integrated lock further comprises (1) a mounting bracket having a first side and a second side, (2) a first recessed area formed in the mounting bracket first side, (3) a second recessed area formed in the mounting bracket second side, and (4) an elongated cylindrical shaft that is received in the first and second recessed areas. In various embodiments, the cylindrical shaft is moveable between: (a) a first unlocked position, and (b) a second locked position in which the cylindrical shaft engages with the one of the front panel, rear panel, first side panel, second side panel or top panel to which the at least one door is coupled.

BRIEF DESCRIPTION OF THE DRAWINGS

Various embodiments of an apparatus, system, and method for monitoring sports performance are described below. In the course of this description, reference will be made to the accompanying drawings, which are not necessarily drawn to scale, and wherein.

DETAILED DESCRIPTION

Figure 1:
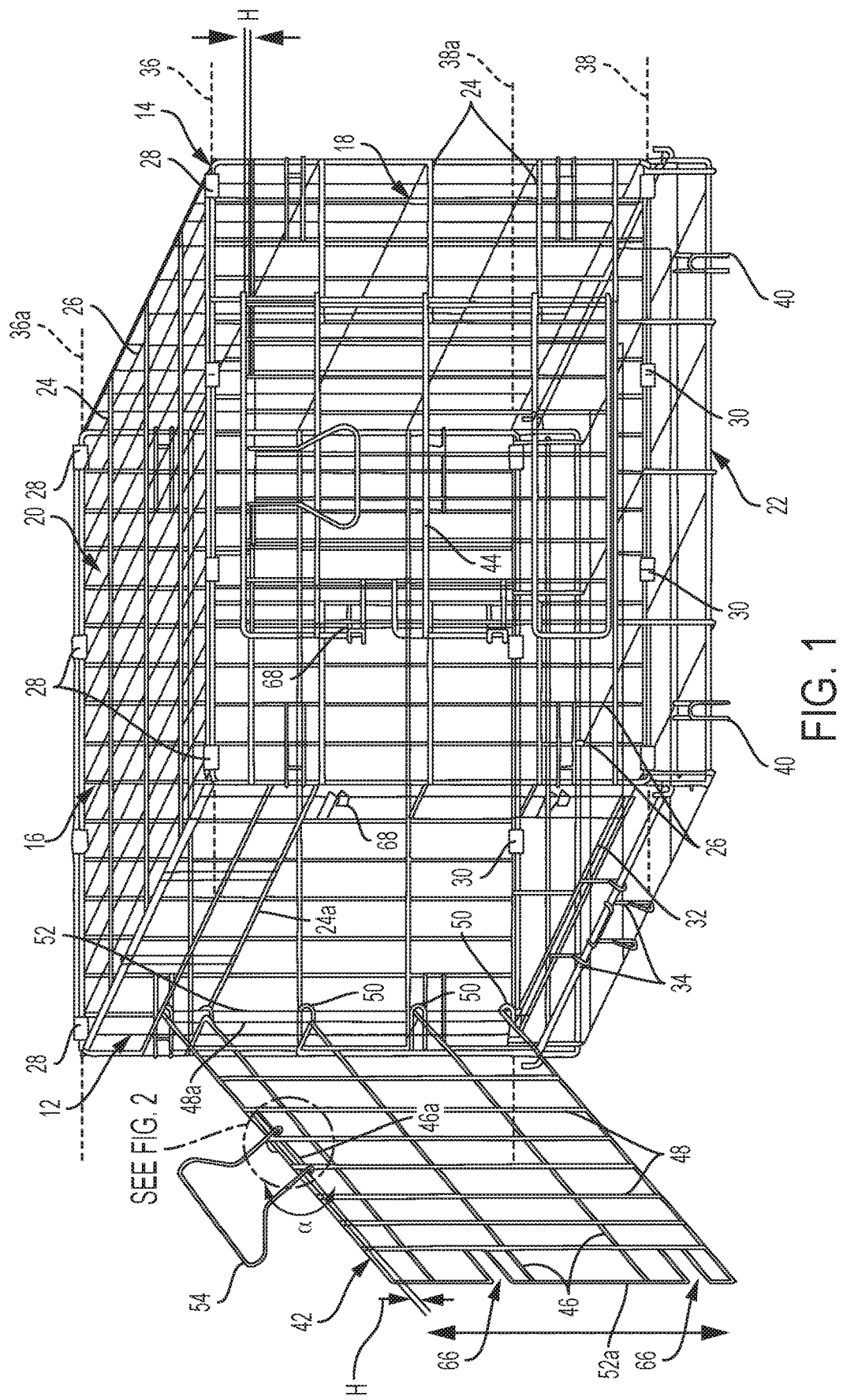
FIG. 1 is a perspective view of an embodiment of an Animal Cage having one or more vertical lift doors.

Various embodiments now will be described more fully hereinafter with reference to the accompanying drawings. It should be understood that the invention may be embodied in many different forms and should not be construed as limited to the embodiments set forth herein. Like numbers refer to like elements throughout.

Overview

The present animal cage consists of a front panel, a rear panel, a right side panel, a left side panel, a top panel and a bottom panel. Each of the panels are formed from one or more horizontal bars coupled to one or more vertical bars. The vertical and horizontal bars may be coupled in any suitable manner, such as by wire, by rings, by weaving the horizontal and vertical bars, by weldments or by any other suitable coupling means. In various embodiments, the horizontal bars and vertical bars for each panel are spot welded. In preferred embodiments, (1) the bottom edge of the first side panel is pivotally coupled to a first edge of the bottom panel, (2) the top edge of the first side panel is pivotally coupled to a first edge of the top panel, (3) an opposite second edge of the top panel is pivotally coupled to the top edge of the second side panel; and (4) a bottom edge of the second side panel is pivotally coupled to an opposite second edge of the bottom panel. In some embodiments, a bottom edge of the front panel is pivotally coupled to a front edge of the bottom panel, and a bottom edge of the rear panel is pivotally coupled to a rear edge of the bottom panel. In this configuration, the front and rear panels can be folded inward and nestled into the bottom panel and the first and second side panels and the top panel can then be folded inward on top of the front and rear panels. One or more fasteners coupled to the bottom panel may then be moved into a locking position to maintain the nestled panels in the bottom panel.

One or more of the front, rear, first side, second side or top panels may contain a door. The door may either be (1) pivotally coupled on one edge of the door to the respective panel or (2) slidably coupled to the respective panel. In either case, the door contains a handle with an integrated lock that allows (1) the door to be locked in a first closed position when the handle is in a first locked position and (2) the door to be moved into a second open position when the handle is in a second unlocked position. One the user moves the handle from the first locked position into the second unlocked position, the user may continue using the handle to either (1) vertically lift the door and pivot it into the second open position or (2) slide the door from the first closed position into the second open position. In embodiments where the door is slidably coupled to the panel, the door handle may be moved back into the first locked position to secure the door in any one of a number of open positions.

In various embodiments, the cage may also contain one or more integrally formed fasteners that may be integrally formed from a horizontal bar that makes up the panel. For example, during fabrication of a panel, one of the bars may be extended past the edge of the panel and bent into a square shaped end so that a portion of the bar is spaced apart from and parallel to another portion of the bar that is within the edges of the panel. The square end may then be bent to form a hook. The portion of the bar that is spaced apart from and parallel to the bar is then welded to one or more cross bars that form the panel. In this configuration, the square hook fastener may be integrally formed with the panel during manufacture of the panel. This provides for a stronger fastener that is less likely to fail due to force exerted by the animal in the cage or when a user is moving the cage.

Because various panels are pivotally coupled to the bottom panel, the front, back, first side, second side and top panels may be collapsed and stored in the bottom panel without physically separating the first and second side panels from the top panel. Moreover, because the front and back panels are each pivotally coupled to the bottom panel, they too can be nestled in the bottom panel without disconnecting them from the bottom panel. During assembly of the cage, the user can engage the square hook fasteners to maintain the cage panels in their operating position without the use of tools.

First Embodiment of an Animal Cage with a Vertically Lifted Door

FIGS. 1-3B illustrate a first embodiment of an animal cage having one or more vertically lifted and locking doors.
Cage Structure Referring to FIG. 1, an animal cage 10 is shown having a front panel 12, a rear panel 14, a right side panel 16, a left side panel 18, a top panel 20 and a bottom panel 22. Each of the front 12, rear 14, right side 16, left side 18, top panel 20 and bottom 22 panels are formed from one or more horizontal bars 24 and vertical bars 26 that are coupled to one another to form the various panels. The right side panel 16 and the left side panel 18 are pivotally coupled to the top panel 20 by one or more couplings 28. The right side panel 16 and the left side panel 18 are also pivotally coupled to the bottom panel 22 by one or more couplings 30. The one or more couplings 28 and 30 may be the same type of couplings or they may be different couplings. In various embodiments, the couplings 28 and 30 may be formed from rings of metal that allow one panel to move relative to the other panel. In other embodiments, each coupling may be formed from a cylindrical body that fits between two adjacent vertical bars. In various embodiments, the front panel 12 has a bottom horizontal bar 32 that is pivotally coupled to the bottom panel 22 by one or more couplings 34. The same is true for the rear panel 14.
Vertically Lifted Door Structure Still referring to FIG. 1, the front panel 12 and the left side panel 18 each have a door 42 and 44, respectively formed therein. For ease of explanation, door 42 will be described in detail. It should be understood by one of ordinary skill in the art that door 44 is similar to and functions substantially the same as that of door 42.

Door 42 is generally square in shape and is formed from a plurality of horizontal bars 46 coupled to a plurality of vertical bars 48. The horizontal bars 46 and vertical bars may be fastened to one another in any suitable manner such as by twisted metal couplings, weldments, adhesive, weaving, etc. In preferred embodiments, the horizontal and vertical bars are spot welded. The door 42 is pivotally coupled to the front panel 12 by one or more couplings 50. The couplings 50 may be any suitable couplings that allow the door 42 to pivot with respect to the front panel 12. In various embodiments, the couplings 50 may be rings of metal or cylindrical couplings similar to couplings 28 and 30. In preferred embodiments, the couplings may be integrally formed with the horizontal bars 46 of door 42. In particular, the horizontal bars may extend past the last vertical bar 52 and are then twisted around one of the vertical bars 48a. In this way, the couplings 50 are sturdy and do not require any type of adhesive or weldments.
Door Handle Referring to FIG. 2, the door 42 comprises a handle 54 that is rotatably mounted to a horizontal bar 46a of the door 42. The horizontal bar 46a is mounted a distance H (FIG. 1) that provides suitable clearance for the handle to rotate with respect to the top bar of the door. In various embodiments, the distance H may be between about 5 mm and 20 mm, in other embodiments the distance H may be between about 8 mm and 15 mm, and in some preferred embodiments the distance H is about 10 mm. The handle is formed from a metal bar having a first end 56 and a second end 58 that form two rings 60 and 62 and two hooks 64 and 66 (e.g., catches, linear stops, etc.). The handle may be pivotally coupled to the horizontal bar 46a in any suitable fashion. In addition to the door handle 54, a hook 55 is formed on the front panel 12 that supports the door 42 when the door is in the closed position.

Figure 2:
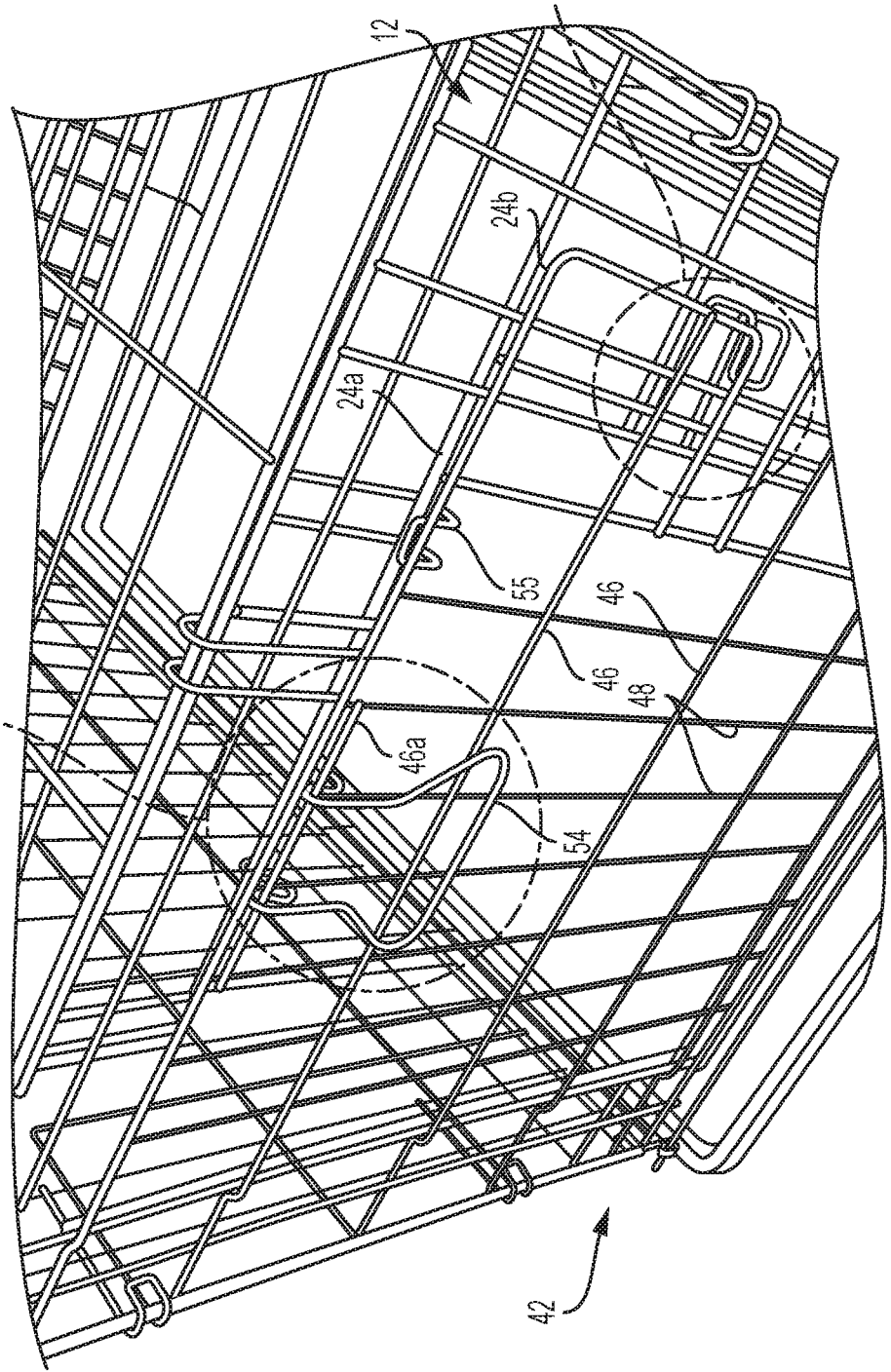
FIG. 2 is a partial rear perspective view of the Animal Cage of FIG. 1 showing a handle and a locking mechanism for the one or more doors.
Figure 2A:
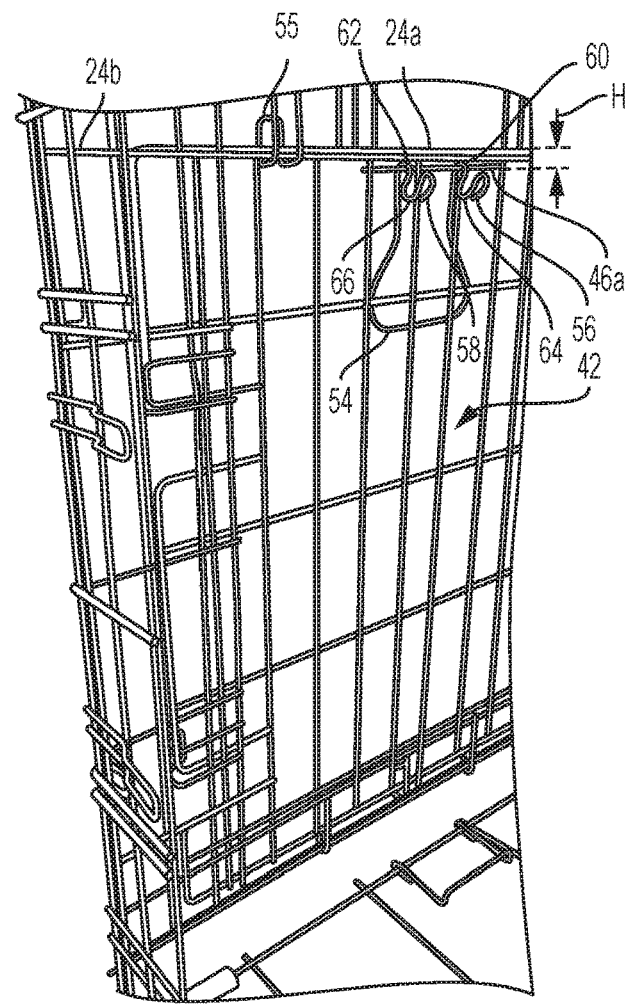
FIG. 2A is a partial perspective view of the locking handle shown in FIG. 2.

In various embodiments and referring to FIG. 2A, the handle is coupled to the horizontal bar 46a by bending the handle proximate the first and second ends 56 and 58 around the bar 46a to form the rings 60 and 62, which are integrally formed on the handle 54. In addition to the rings 60 and 62, the handle 54 intermediate the rings 60 and 62 and the ends 56 and 58 are also bent to form hooks 64 and 66, which are used to prevent the door 42 from sliding vertically upward. That is, the hooks 64 and 66 engage a horizontal bar 24a when the handle is in a first locked position, as shown in FIG. 2, when the door 42 is lifted.

Figure 2B:
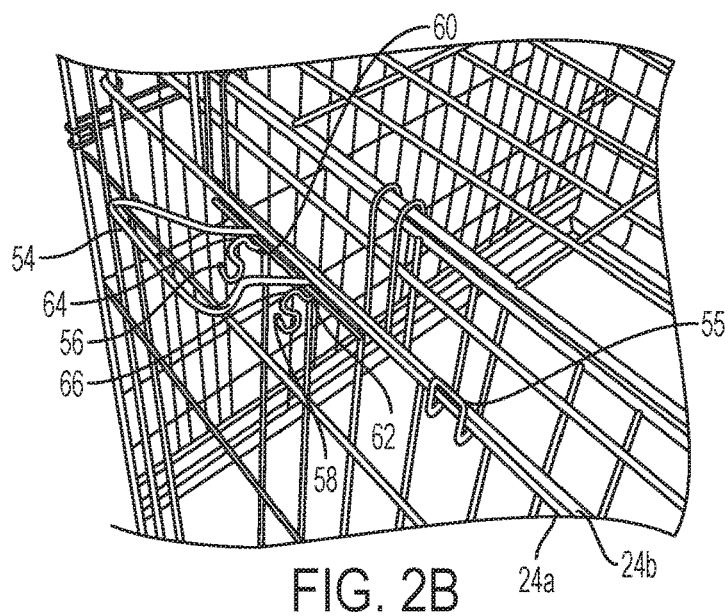
FIG. 2B is a partial front perspective view of the handle of FIG. 2.

Referring to FIG. 2B, the handle 54 is shown in a second unlocked position. The handle 54 may be moved from the first locked position (FIG. 2A) into the second unlocked position (FIG. 2B) by grasping the handle 54 and rotating the handle about the horizontal bar 24a. The handle may be rotated from about zero degrees (i.e. the first locked position in FIG. 2A) to about one hundred and twenty degrees (i.e., the second unlocked position in FIG. 2B). It should be understood that the rotation of the handle may be less or more than about one hundred and twenty degrees depending on the angle of the hooks 62 and 64. That is, the handle 54 must be rotated sufficiently to allow the hooks 62 and 64 to rotate far enough so that when the handle 54 is lifted, the hooks clear bar 24a and do not interfere with the front panel 12 (FIG. 1) as the door is lifted.

Door Locking Mechanism

Referring once again to FIG. 1, the door 42 contains one or more openings 66 formed in the vertical bar 52a. The openings are part of a locking mechanism that align with one or more hooks 68 formed on the front panel 12. The one or more hooks 68 may be formed integral with the front panel 12 or they may be coupled to the front panel 12 using adhesive, weldments, or any other suitable securing means.

Figure 3B:
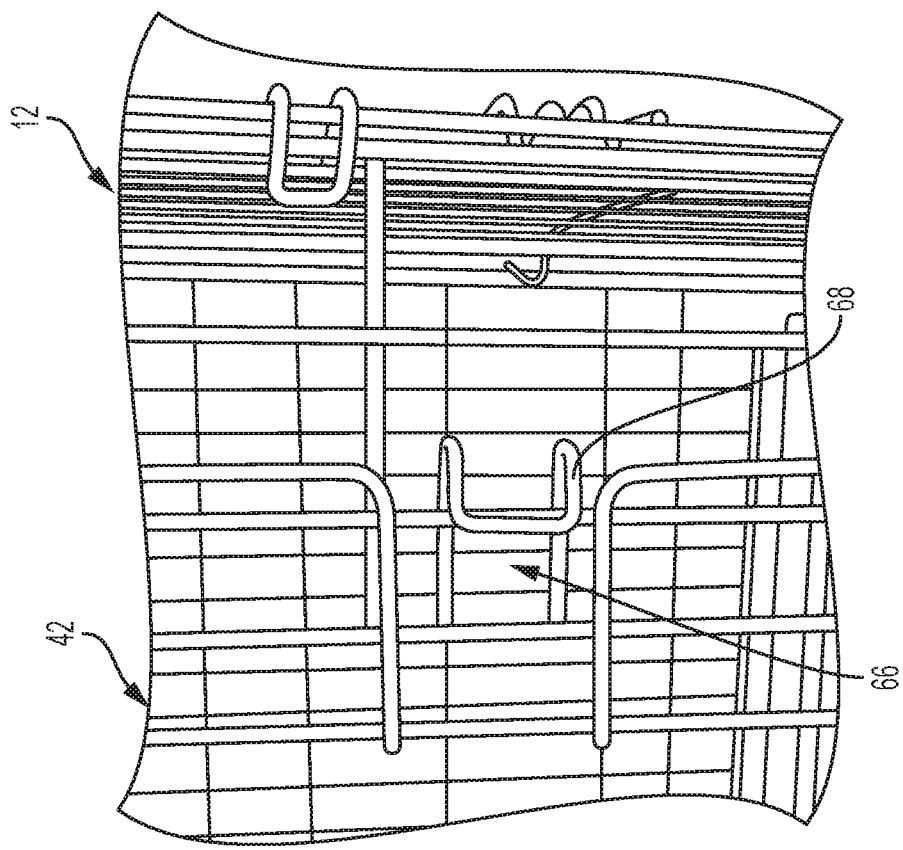
FIG. 3B is a partial perspective view of the locking mechanism shown in FIG. 2 with the one or more doors in an unlocked position.
Figure 3A:
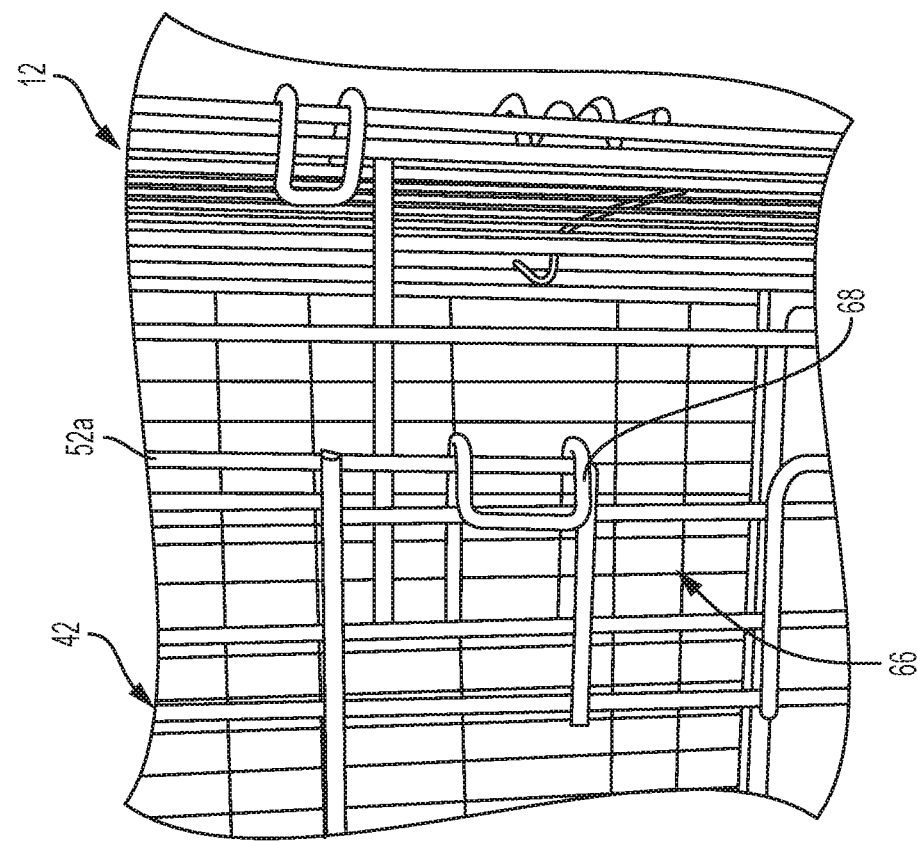
FIG. 3A is a partial perspective view of the locking mechanism shown in FIG. 2 with the one or more doors in a locked position.

Referring to FIGS. 3A-3B, in various embodiments, the one or more hooks 68 are coupled to the front panel 12 by weldments and are positioned so that the hooks 68 overlap the bar 52a that forms the edge of the door 42. As such and referring specifically to FIG. 3A, when the handle 54 is in the first position (as shown in FIG. 2) the one or more hooks 68 overlap the edge of the door 42 and help to retain the door in the closed position. Moreover and referring specifically to FIG. 3B, when the handle 54 (FIG. 1) is lifted into the second position (FIG. 2B) and the door 42 is lifted upward, the one or more openings 66 formed in the door 42 align with the one or more hooks 68 thereby allowing the door to rotate about vertical bar 48a of the front panel 12 by the one or more couplings 50 (FIG. 1).

Based on the above, one or more openings 66 and one or more hooks 68 forms a door locking mechanism that prevents the door 42 from opening until the door 42 is lifted allowing the hooks to align with the openings. Furthermore, the handle 54 provides a secondary locking mechanism via the one or more handle hooks 64 and 66 that prevent the door from being lifted until the handle 54 is rotated a sufficient amount for the one or more hooks 64 and 66 to clear the front panel bar 24b (FIG. 1).

Operation of Vertically Lifted Door

As described above in the detailed description of the cage above, the one or more doors 42 and 44 are movable between a first locked position (door 44 of FIG. 1) and a second unlocked position (door 42 of FIG. 1). In order to move the door from the first locked position to the second unlocked position, the user grasps the handle 54 and rotates it upward by a predetermined amount (e.g., 40-180 degrees upward) from the position shown in FIG. 2) such that the handle 54 rotates about horizontal 24a on the one or more rings 60 and 62 (FIG. 2A). As the handle 54 rotates, the one or more hooks 64 and 66 rotate a sufficient distance such that the hooks are clear of the horizontal bar 24b of the front panel. Once in this position, the user can lift the door vertically upward so that the door 42 slides upward with respect to the front panel 12.

The door 42 is able to both rotate with respect to the front panel vertical bar 48a and slide relative to the front panel bar 48a via the one or more couplings 50. Once the door is moved vertically upward from the first locked position (FIG. 3A) where the one or more hooks 68 overlap the door bar 52a into the second opened position (FIG. 3B) where the one or more hooks 68 align with the one or more openings 66 formed in the door 42, the user may then pull the handle 54 away from the front panel thereby causing the door to rotate from the first closed position (door 44 in FIG. 1) into the second opened position (door 42 in FIG. 1). It should be understood to one of skill in the art that closing the door requires the opposite steps described above.

Second Embodiment of an Animal Cage with a Horizontally Sliding Door

FIGS. 4-8B illustrate a second embodiment of an animal cage having one or more horizontally sliding and locking doors.

Cage Structure

Figure 4:
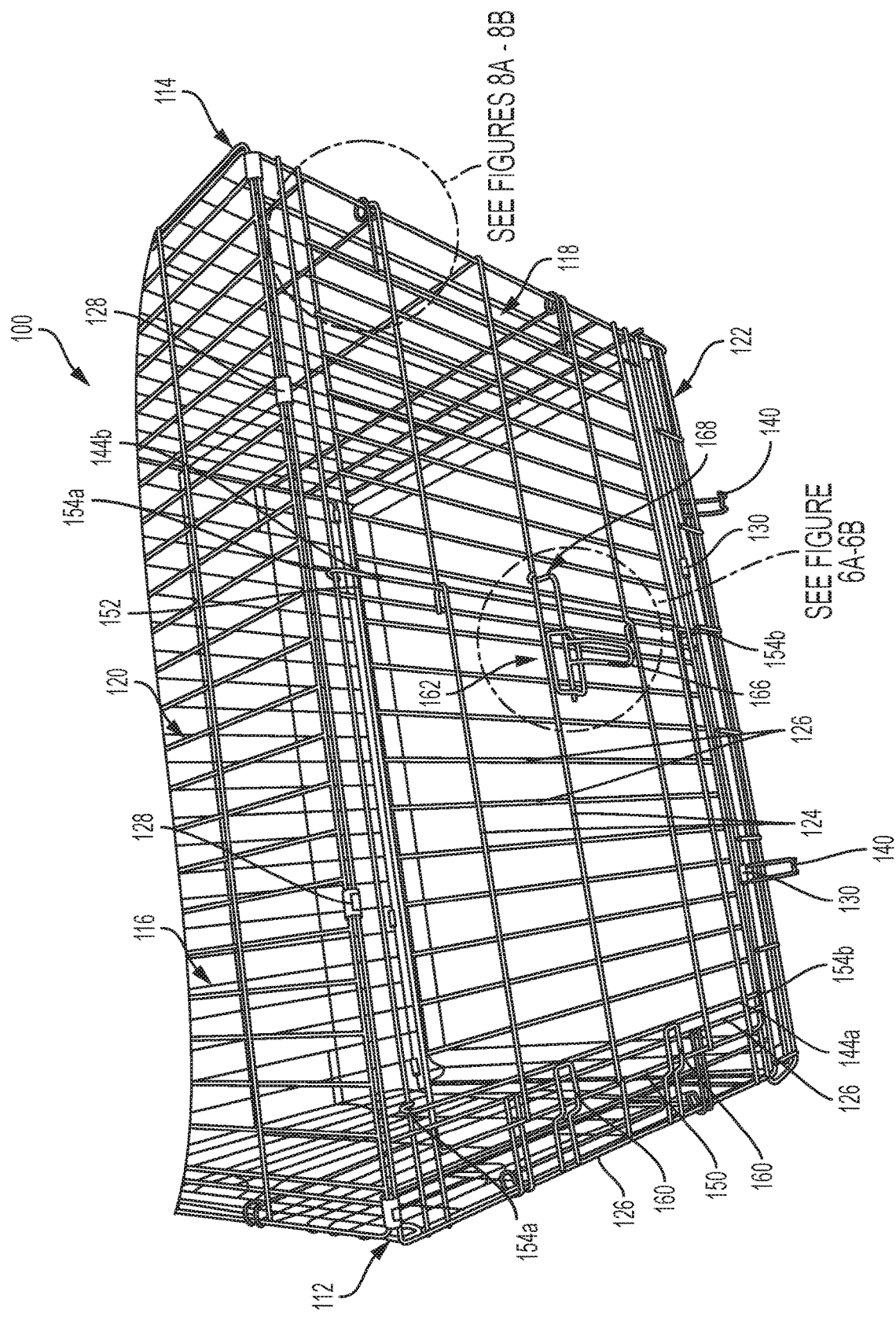
FIG. 4 is perspective view of another embodiment of an Animal Cage having a horizontally sliding door with a handle locking mechanism.

Referring to FIG. 4, an animal cage 100 is shown having a front panel 112, a rear panel 114, a right side panel 116, a left side panel 118, a top panel 120 and a bottom panel 122. Each of the front 112, rear 114, right side 116, left side 118, top panel 120 and bottom 122 panels are formed from one or more horizontal bars 124 and vertical bars 126 that are coupled to one another to form the various panels. The right side panel 116 and the left side panel 118 are pivotally coupled to the top panel 120 by one or more couplings 128 (only viewable between the top and left side panels) similar to those described with respect to the animal cage of FIG. 1. The right side panel 116 and the left side panel 118 are also pivotally coupled to the bottom panel 122 by one or more couplings 130. The one or more couplings 128 and 130 may be the same type of couplings or they may be different couplings. In various embodiments, the couplings 128 and 130 may be formed from rings of metal that allow one panel to move relative (e.g., pivot, slide, etc.) to the other panel. In other embodiments, each coupling 128 and 130 may be formed from a cylindrical body that fits between two adjacent vertical bars and surrounds two adjacent horizontal bars.

Figure 5:
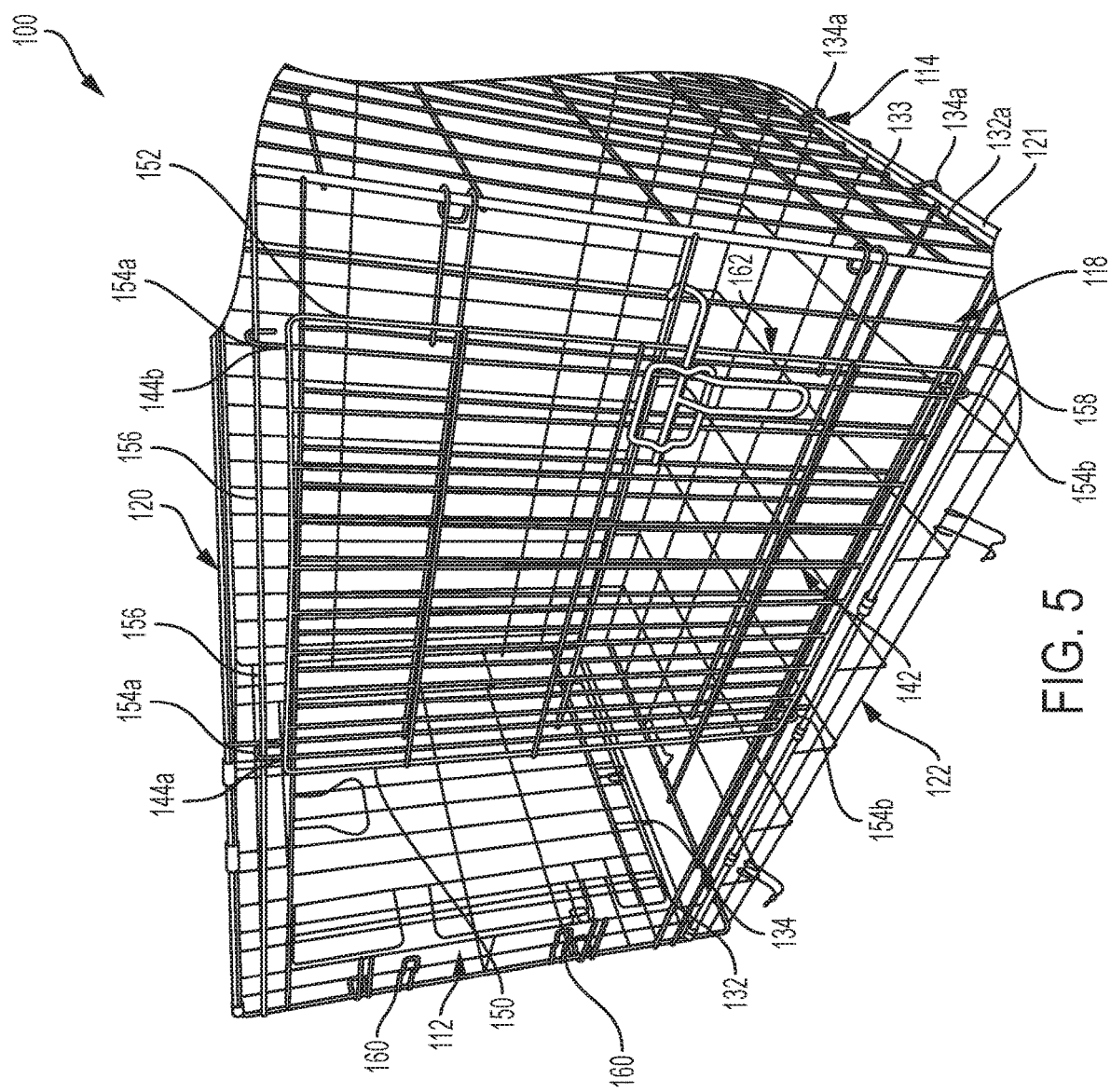
FIG. 5 is a perspective view of the Animal Cage of FIG. 4 with the door in the open position.

In various embodiments and referring to FIG. 5, the front panel 112 has a bottom horizontal bar 132 that is pivotally coupled to the bottom panel 122 by one or more couplings 134. The same is true for the rear panel 114. That is, the rear panel 114 has a horizontal bar 132a that is pivotally coupled to the bottom panel 122 by one or more couplings 134a. In various embodiments, the one or more couplings 134 and 134a may be formed from wire rings, cylindrical couplings similar to couplings 128 and 130, or the couplings may be formed integral with a bar 133 by bending the end of the bar into a loop that forms the coupling 134 or 134a. In this way, manufacturing of the cage may be simplified by forming the couplings integral with the cage, which are less likely to bend, break or fail. In the embodiment shown in FIG. 5, the coupling is integrally formed with the bar 133 and the end of the bar is wrapped around a horizontal bar 121 of the bottom panel 122.

Horizontally Sliding Door Structure

Still referring to FIG. 4, the left panel 118 has a door 142 formed therein. It should be understood by one of ordinary skill in the art that a similar door may be formed in the right panel 116 or a vertically lifted door 42 (FIG. 1) may also be formed in one or both of the front panel 112 or the rear panel 114.

Door 142 is generally square or rectangle in shape and is formed from a plurality of horizontal bars 146 coupled to a plurality of vertical bars 148. The horizontal bars 146 and vertical bars 148 may be fastened to one another in any suitable manner such as by twisted metal couplings, weldments, adhesive, weaving of the horizontal and vertical bars, etc. In preferred embodiments, the horizontal and vertical bars are spot welded. The door 142 has a first vertical bar 144a at a first end 150 and a second vertical bar 144b at a second end 152 of the door 142.

Referring specifically to FIG. 5, the first and second vertical bars 144a and 144b each have a first hook 154a at a first end and a second hook 154b at a second end. The first hooks 154a are positioned around a first horizontal bar 156 and the second hooks 154b are positioned around a second horizontal bar 158. In this configuration, the first and second vertical bars slidably couple the door 142 to the left panel 118 via the first and second horizontal bars 156 and 158.

Referring once again to FIG. 4, one or more door catches 160 are mounted to the left panel 118 adjacent the first side of the door 150. The one or more door catches may be formed from any suitable material such as metal, alloy, plastic, etc. and is coupled to the left panel via any suitable coupling mechanism such as adhesive, weldments, rivets, forming it integrally with the left panel, etc. In various embodiments, the one or more door catches 160 are formed from elongated cylindrical metal bars that are bent into shape as shown in the figures. The door catches 160 are generally spot welded on the left panel 118 to one or more of the vertical bars 126.

Door Handle and Integrated Lock

Figure 6A:
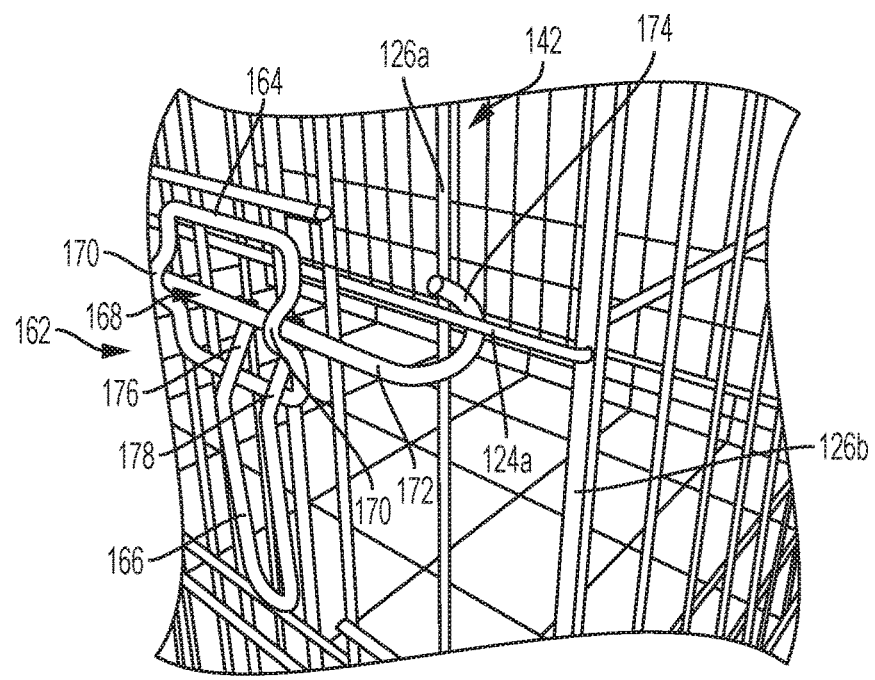
FIGS. 6A and 6B are partial perspective views of the handle locking mechanism for the Animal Cage of FIG. 4.
Figure 6B:
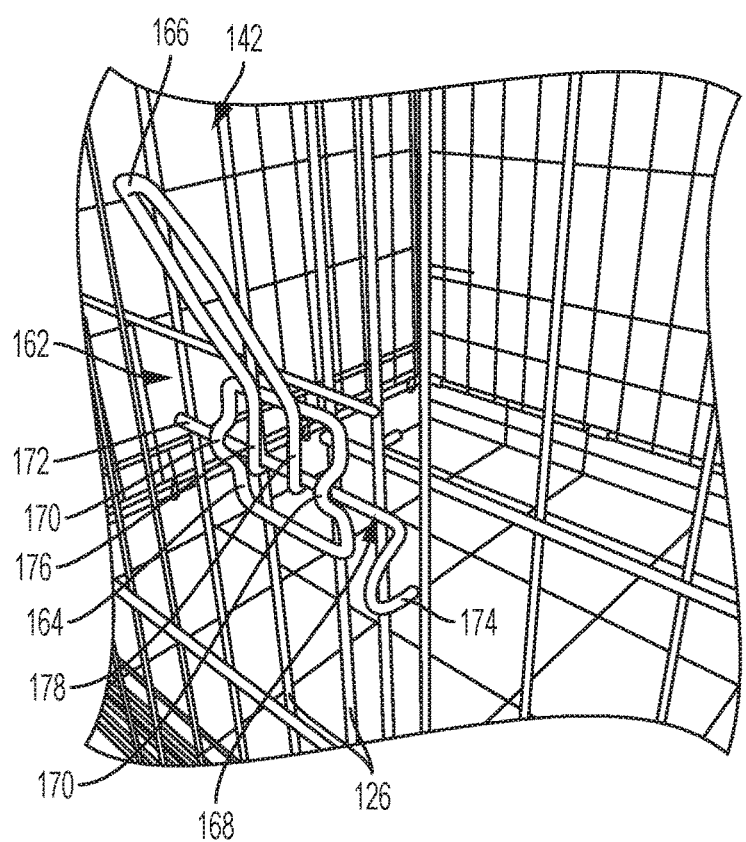

Referring to FIGS. 4 and 6A-6B, the door 142 comprises a handle and integrated lock 162 that is rotatably mounted to the door 142. The door handle and integrated lock 162 comprises a mounting bracket 164, a handle 166 and a locking latch 168. In one embodiment, the bracket 164 is formed from a metal bar that is bent into a square shape with two raised portions 170 that are configured to rotatably receive the latch 168. The bracket 164 is spot welded to one or more vertical bars 126 in order to retain the bracket 164 on the door 142. In some embodiments, the bracket 164, the handle 166 and the locking latch 168 may be formed from a metal or metal alloy. In other embodiments, the components may be formed from a polymer or polymer/metal combination. It should be understood that the handle and integrated lock components may be formed from any suitable material depending on the application.

The locking latch 168 is formed from an elongated cylindrical body and has a first linear portion 172 and a second hook portion 174. In various embodiments, the locking latch 168 may be formed from the same material as the cage 100, for example a metal or metal alloy. In particular, an elongated metal rod may be bent at one end to form the hook portion 174. The elongated rod is then positioned with respect to the bracket 164 in the two raised portions 170 thereby allowing the locking latch 168 to rotate with respect to the bracket 164.

The handle 166 is generally U-shaped and may be formed from an elongated cylindrical body such as a rod that is shaped. In various embodiments, the handle may be formed from a metal/alloy cylindrical rod that is bent into a U-shape. Each end 176 and 178 of the handle 166 is bent with respect to the handle portion so as to allow the ends 176 and 178 to be coupled to the locking latch 168 through the bracket as shown in FIGS. 6A and 6B. The handle ends 176 and 178 may be spot welded to the latch linear portion 172 or secured thereon in any suitable manner depending on the materials used. When the bracket 164, the locking latch 168 and the handle 166 are configured as described above and attached to the door 142, the handle 166 may be lifted with respect to the bracket 164 thereby causing the locking latch 168 to rotate with respect to the bracket 164.

Referring to FIG. 6A, the door 142 is shown in an open position (see FIG. 5) where the door handle 166 is at rest (i.e., lying parallel to the left panel 118. In this first locked position, the locking latch 168 is rotated such that the hook portion 174 is wrapped around a horizontal bar 124a between two adjacent vertical bars 126a and 126b. Because the hook portion 174 wraps around the horizontal bar 124a in between the two adjacent vertical bars 126a and 126b, the door can only slide a very short distance (i.e., the distance between vertical bars 126a and 126b).

Referring to FIG. 6B, the door is shown in a closed position (see FIG. 4) where the door handle 166 is rotated into the second unlocked position (i.e., rotated from zero degrees through about 180 degrees). It should be understood to one of skill in the art that the amount of rotation of the door handle 166 may vary depending on the distance the hook portion 174 must rotate to clear the vertical bars, as shown in FIG. 6B. In various embodiments, the handle 166 must be rotated between about 90 and 180 degrees, in other embodiments, the handle 166 must be rotated between about 100 and 130 degrees and in preferred embodiments the handle 166 must be rotated between about 110 and 125 degrees in order to cause the locking latch 168 to rotate a sufficient amount to allow the hook portion 174 to clear the vertical bars. On of skill in the art should understand that the angle of rotation necessary to allow the hook portion 174 to rotate from between the bars is a function of the position of the linear portion 172 when the handle 166 is coupled to the linear portion 172 and the length of the hook portion 174.

Operation of Horizontally Sliding Door

Referring once again to FIG. 4, the handle and integrated lock 162 is shown in the first locked position with the door 142 shown in a first closed position. That is, the first end of the door 150 is received behind the door catches 160 and the locking latch hook portion 174 (FIG. 6A) is wrapped around a horizontal bar and positioned between two adjacent vertical bars. In this position, a person or animal is prevented from opening the door 142. Referring to FIG. 5, the handle and integrated lock 162 is again shown in the first locked position with the door 142 shown in a second opened position.

In order for a user to move the door from the first closed position (FIG. 4) into the second opened position (FIG. 5), the user would grasp the handle 166 and lift it by about 120 degrees thereby causing the locking latch 168 to rotate. As the locking latch 168 rotates, the hook portion 174 (FIG. 6B) rotates out from between two adjacent vertical bars thereby allowing the user to slide the door 142 via the handle 166 to the left (with respect to the view in FIG. 4) thereby opening the door. The door slides via the connection of the first hooks 154a on first horizontal bar 156 and the second hooks 154b on the second horizontal bar 158 (FIG. 5).

While the above description indicates that the door can be moved from a first closed position into a second opened position and locked in either of these position, one of skill in the art should understand that the door may be moved into any number of intermediate open position since the handle and integrated lock 162 allows the user to lock the door in a plurality of open positions. The number of open positions is only limited by the number of sets of adjacent vertical bars in between which the hook portion 174 (FIG. 5) may be positioned.

Third Embodiment of an Animal Cage with Integrated Square Hook Fasteners

With reference to the cage embodiments shown in FIG. 1 and FIG. 4 and the respective detailed description above, it should be understood that the couplings 28, 128 and 30, 130 allow for the right panel 16, 116 and the left panel 18, 118 to fold relative to the top panel 20, 120 and the bottom panel 22, 122. For example, in various embodiments, when the front panel 12, 112 and the rear panel 14, 114 are folded inward toward the bottom panel 22, 122, the top panel 20, 120 can be pivoted about axis 36a (only shown in FIG. 1, but applicable to FIG. 4) so that axis 36 (only shown in FIG. 1, but applicable to FIG. 4) moves diagonally toward pivot axis 38a (only shown in FIG. 1, but applicable to FIG. 4) so that the left panel 18, 118 pivots about pivot axis 38 (only shown in FIG. 1, but applicable to FIG. 4). Additionally, pivot axis 36a (only shown in FIG. 1, but applicable to FIG. 4) will also move diagonally toward pivot axis 38 (only shown in FIG. 1, but applicable to FIG. 4) so that the right panel 16, 116, left panel 18, 118 and top panel 20, 120 all nestle into the bottom panel 22, 122 on top of the front panel 12, 112 and the rear panel 14, 114. In the collapsed position, one or more locking mechanisms 40, 140 that are pivotally coupled to the bottom panel may be rotated to lock the folded panels in place. That is, the locking mechanisms flip up and over the folded top and side panels to retain these panels in place and make transport and storage of the animal cage easy. In various embodiments, the locking mechanisms 40, 140 may be hooks, clasps, hook and eye type locks, etc. It should be understood that the locking mechanism may also be a U-shaped metal rod that is bent around one of the horizontal bars so that it is pivotally coupled to the horizontal bar.

Figure 7:
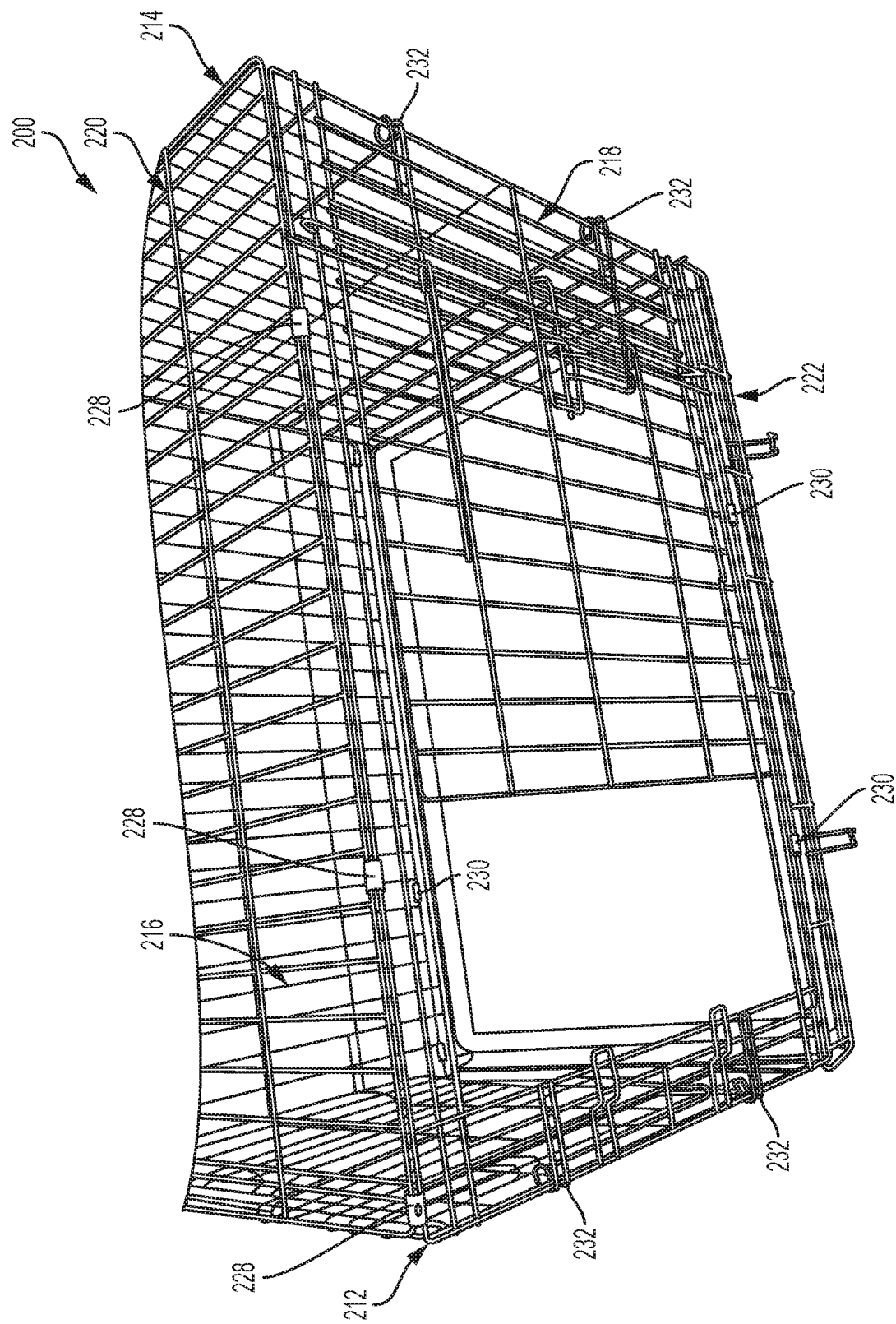
FIG. 7 is a partial perspective view of the Animal Cage of FIG. 4 with the door shown open and in a locked position.
Figure 8B:
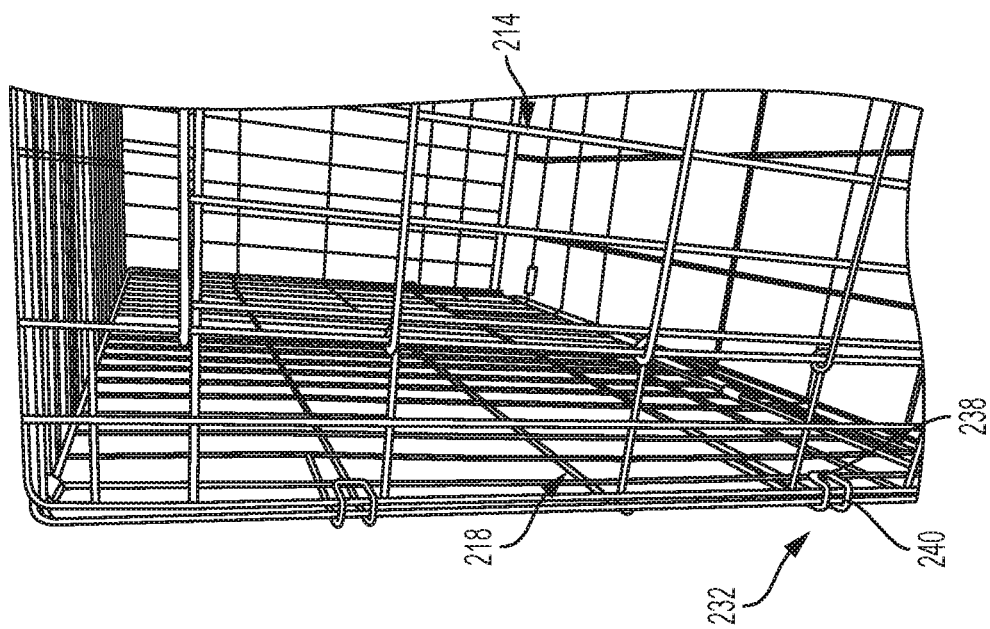
FIGS. 8A-8B are partial perspective views of the Animal Cage of FIG. 4 showing an integrally formed hooking mechanism for maintaining the cage in a non-folded position.

Referring to FIGS. 7-8B, a cage 200 is shown with similar panels to that described above in the embodiments of FIGS. 1-3B and FIGS. 4-6B. For ease of explanation and simplicity, only relevant numbering will be used on FIGS. 7-8B. Referring specifically to FIG. 7, cage 200 is shown having a front panel 212, a back panel 214, a right panel 216, a left panel 218, a top panel 220 and a bottom panel 222. The panels are formed similar to those described herein in that vertical and horizontal bars are joined to form each panel The top panel 220 is pivotally coupled to the left panel 218 via couplings 228 and pivotally coupled to the bottom panel 222 by couplings 230. The right panel 216 is also pivotally coupled to the top panel 220 by couplings 228 (not shown) and pivotally coupled to the bottom panel 222 by couplings 230. The front panel 212 and rear panel 214 are only pivotally coupled to the bottom panel 222 via couplings (not shown in the Figures) as described with reference to the embodiments shown in FIGS. 1 and 4. That is, one or more of the vertical bars that form the front panel 212 and the rear panel 214 are bent around a horizontal bar from the bottom panel 222 thereby forming a pivoting coupling between the front panel and the bottom panel at a lower edge of the front panel. The same type of pivotal connection is also formed between one or more vertical bars of the rear panel 214 and a horizontal bar on the bottom panel 222.

In the configuration described with respect to FIG. 7, the front panel 212 and the rear panel 214 are pivotally connected to the bottom panel and are not permanently coupled to the right panel 216, the left panel 218 and the top panel 220. Thus, when the front panel 212 and the rear panel 214 are moved into the position shown in FIG. 7, one or more fasteners 232 are used to secure the front panel 212 and/or the rear panel 214 relative to the right panel 216, the left panel 218 and the top panel 220.

Figure 8A:
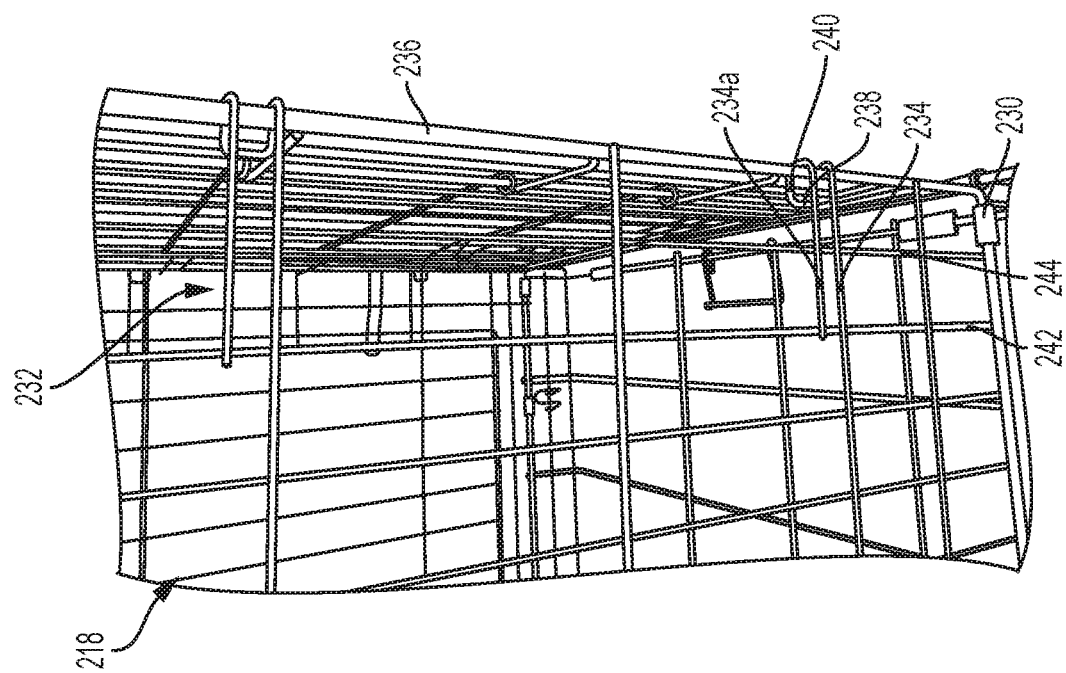
Figure 9B:
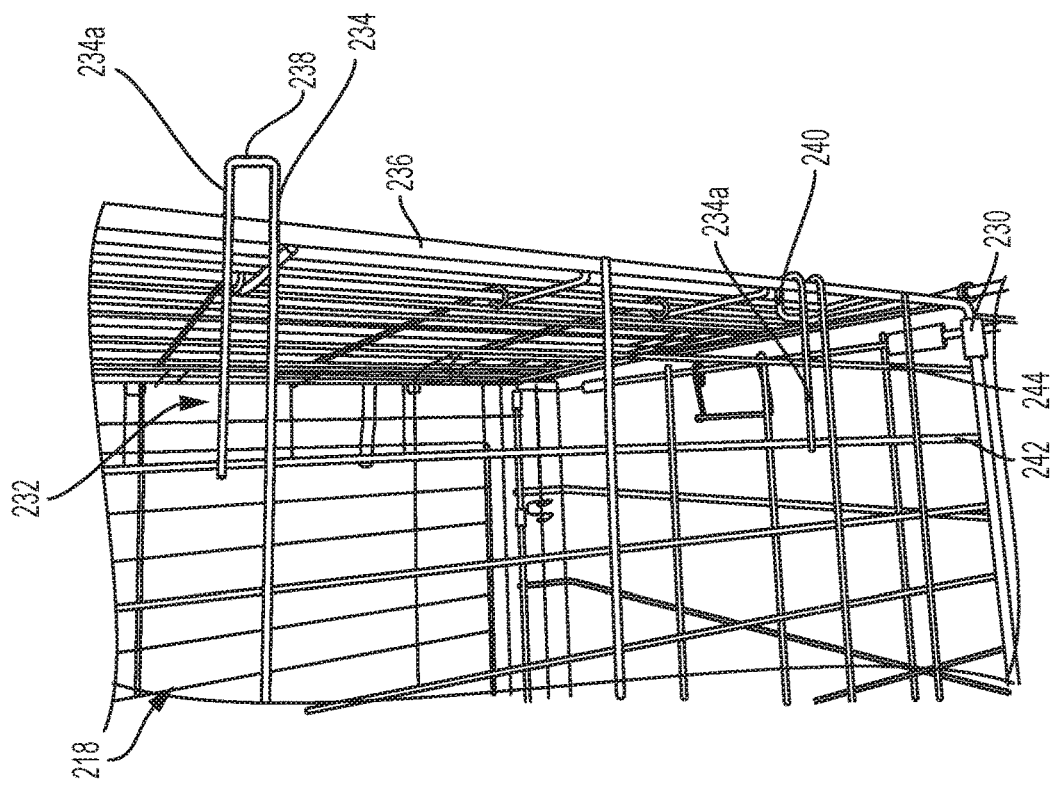
FIG. 9A-9C illustrate a method of forming the integrally formed hooking mechanism of FIGS. 8A-8B.
Figure 9A:
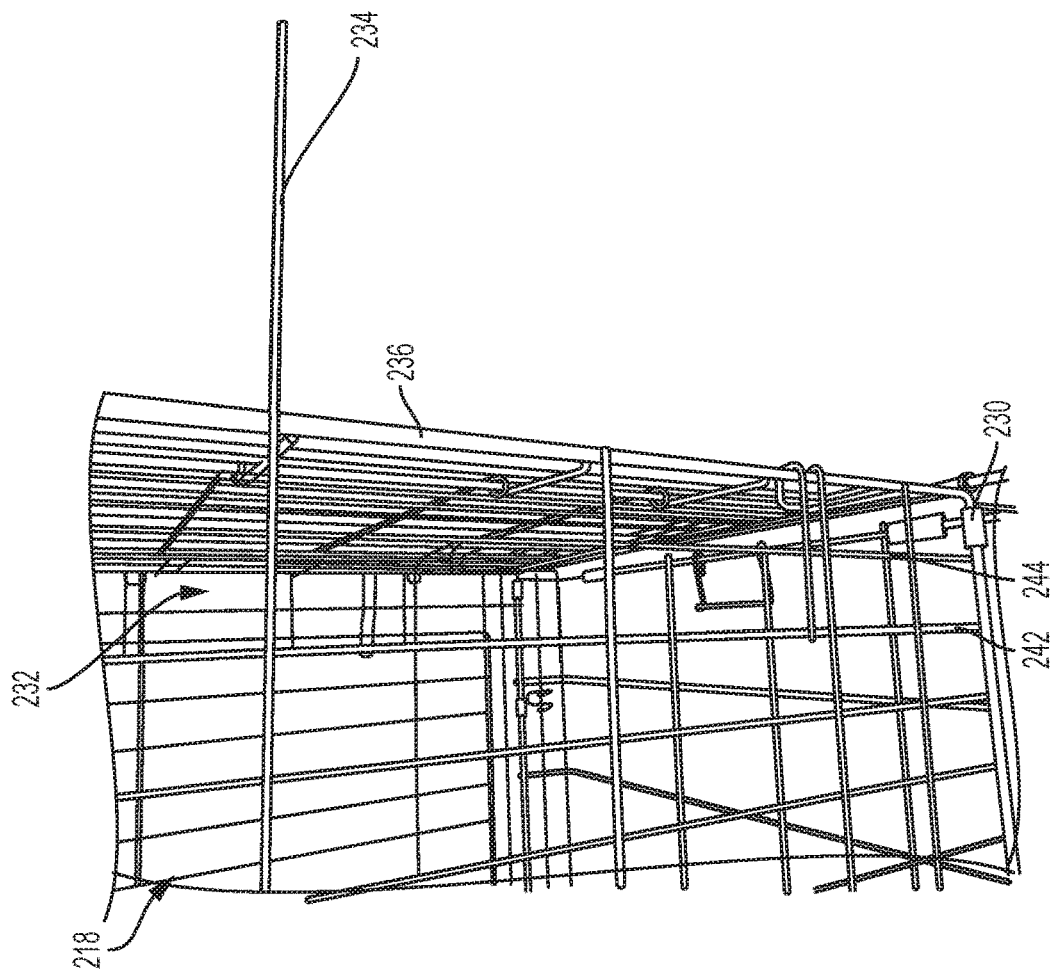
Figure 9C:
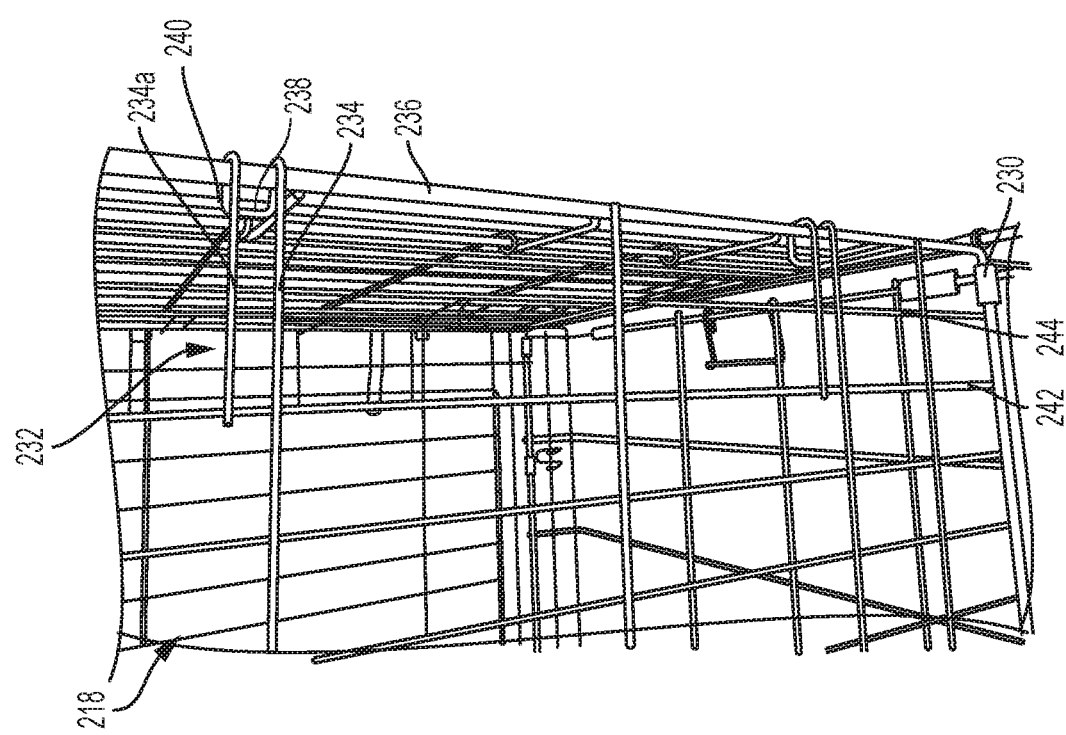

In particular, and referring to FIGS. 8A and 8B, each of the fasteners 232 are integrally formed with at least one of the horizontal bars that are used to form the right panel 216, left panel 218 and top panel 222. More specifically and referring to FIGS. 9A-9C, during manufacture of the right, left and top panels, one or more of the bars (e.g., bar 234 extends past an end 236 of the panel 218 (FIG. 9A). The extension portion is then bent around to form a square end 238 (FIG. 9B) with a second bar 234a that is parallel to the original bar 234. Referring specifically to FIG. 9C, the square end 238 is then bent transverse to a plane that contains parallel bars 234 and 234a forming a hook 240 at the square end 238. The parallel second bar 234a is then coupled to one or more vertical bars 242 and 244 via any suitable method such as weldments, etc. With the fasteners integrally formed in one or more of the right, left and top panels, the fasteners are stable and strong so they are not easily broken by an animal that is placed within the cage or during movement of the cage. Moreover, the integral square hook fasteners 232 are also unobtrusive since they are formed integral with the panels.

When assembling the cage, the user first lifts one of the right and left panels thereby causing the top and the other one of the right and left panels to move into place. Once the right panel 216 and left panel 218 are vertical and the top panel 218 is horizontal and substantially parallel to the bottom panel 220, the user can then grasp one of the front panel 212 or rear panel 214 upward so that it pivots with respect to the bottom panel 222. As the front panel or rear panel 214 is rotated upward, each side of the panel is snapped into the hook portions 240 of the fasteners 232 to retain the front or rear panel in place. The panel is retained in the hooks by pulling the top edge of the of the front or rear panel outside the ends of the top panel. As such, the overall age structure may be held and retained in place easily without the need for tools.

Conclusion

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations as confirmed by the various embodiments disclosed herein. Therefore, it is to be understood that the invention is not to be limited to the specific embodiments disclosed and that the modifications and other embodiments are intended to be included within the scope of the appended exemplary concepts. Although specific terms are employed herein, they are used in a generic and descriptive sense only and not for the purposes of limitation.

What is claimed:

1. An animal cage comprising:
   a. a front panel, a rear panel, a first side panel, a second side panel, a top panel, and a bottom panel, wherein each of the front panel, rear panel, first side panel, and second side panel are formed from a plurality of horizontal bars and a plurality of vertical bars, wherein the plurality of horizontal bars comprises a subset of horizontal bars extending from a first edge of a panel to a second edge of the panel;
   b. a first door operatively coupled to one of the front panel or the rear panel, the first door being both pivotally and slidably coupled to the front panel or the rear panel to which the first door is coupled along a first edge of the first door;
   c. a second door operatively coupled to one of the first side panel or the second side panel, the second door being slidably coupled to the first side panel or the second side panel to which the second door is coupled such that the second door is horizontally slidable between a first closed position and a second open position along at least one horizontal bar of the subset of horizontal bars extending from the first edge of the panel to the second edge of the panel; and d. an integrated handle and lock mechanism coupled to the first door or the second door, wherein the integrated handle and lock mechanism comprises:
  i. a handle; and
  ii. a lock coupled to the handle, the lock comprising one or more catches, wherein:
  the integrated handle and lock mechanism is rotatable between:
    a first locked position in which:
      the handle is substantially parallel to a surface defined by the first door or the second door; and
      the one or more catches engage with at least one of the horizontal bars or at least one of the vertical bars that form one panel to which the first door or the second door is coupled; and
    a second unlocked position in which:
      the handle is no longer parallel to the surface defined by the first door or the second door; and
      the one or more catches disengage from the at least one of the horizontal bars or the at least one of the vertical bars that form the one panel to which the first door or the second door is coupled.

2. The animal cage of claim 1, wherein:
a. the first door comprises at least one opening formed in a vertical bar that defines a second side edge of the first door; and
b. the handle is pivotally coupled adjacent a top edge of the first door.

3. The animal cage of claim 2, further comprising at least one latch coupled to the one panel to which the first door is coupled, wherein when the integrated handle and locking mechanism is rotated from the first position into the second position, the first door is moveable between:
a. a first closed position in which the at least one latch does not align with the at least one opening formed in the vertical bar that defines the second side edge of the first door and the first door will not rotate with respect to the one panel to which it is coupled;
b. a second intermediate position in which the at least one latch aligns with the at least one opening formed in the vertical bar that defines the second side edge of the first door; and
c. a third open position in which the first door is in an open position.

4. The animal cage of claim 3, wherein:
a. the first door is slidable between the first closed position and the second intermediate position; and
b. the first door is rotatable between the second intermediate position and the third open position.

5. The animal cage of claim 2, wherein:
a. the first door is formed from a plurality of horizontal bars coupled to a plurality of vertical bars;
b. one or more ends of the plurality of horizontal bars along the first side edge of the first door is bent around a first vertical bar of the one panel to which the first door is coupled to form a loop so that the first door is both slidable and rotatable with respect to the one panel to which the first door is coupled.

6. The animal cage of claim 1 wherein
a. the handle is formed by bending an elongated cylindrical bar so that a first end of the bar is proximate to a second end of the bar;
b. the first end of the bar is bent to form a first catch, and
c. the second end of the bar is bent to form a second catch.

7. The animal cage of claim 6, wherein the handle is rotated about 120 degrees in order to move the handle from the first locked position into the second unlocked position.

8. The animal cage of claim 1, wherein:
a. a bottom edge of the first side panel is rotatably coupled to a first edge of the bottom panel;
b. a top edge of the first side panel is rotatably coupled to a first edge of the top panel;
c. a bottom edge of the second side panel is rotatably coupled to an opposite second edge of the bottom panel;
d. a top edge of the second side panel is rotatably coupled to an opposite second edge of the top panel;
e. a bottom edge of the front panel is rotatably coupled to a third side edge of the bottom panel that is intermediate the first edge and the second edge of the bottom panel; and
f. a bottom edge of a back panel is rotatably coupled to a fourth side edge of the bottom panel that is intermediate the first edge and the second edge of the bottom panel, wherein the first side panel, the second side panel, the front panel, the rear panel, the top panel and the bottom panel all define an inside space of the animal cage.

9. The animal cage of claim 8 further comprising one or more couplings, each coupling being integrally formed with at least one of the first side panel, the second side panel and the top panel.

10. The animal cage of claim 9, wherein the one or more couplings is integrally formed from one of the plurality of horizontal bars or one of the plurality vertical bars that form the first side panel, the second side panel or the top panel.

11. The animal cage of claim 9, further comprising:
a. a first coupling formed at a front edge of the first side panel, wherein the first coupling defines a hook that bends toward the inside space of the animal cage;
b. a second coupling formed at an opposite back edge of the first side panel, wherein the second coupling defines a hook that bends toward the inside space of the animal cage;
wherein
  the first coupling is formed by bending an end of one of the plurality of horizontal bars that extends past the front edge of the first side panel into a hook shaped end,
  the second coupling is formed by bending an end of one of the plurality of horizontal bars that extends past the rear edge of the first side panel into a hook shaped end,
  the first coupling is configured to engage with a first one of the plurality of vertical bars that form the front panel adjacent a first side edge of the front panel, and
  the second coupling is configured to engage with a first one of the plurality of vertical bars that form the rear panel adjacent a first side edge of the rear panel.

12. The animal cage of claim 1, wherein:
a. the handle is pivotally coupled adjacent an edge of the first door or the second door.

13. The animal cage of claim 12, wherein when the integrated handle and lock mechanism is rotated from the first position into the second position, the first door or second door is slidable between:
a. the first closed position; and
b. the second open position.

14. The animal cage of claim 12, wherein the handle and integrated lock further comprises:
a. a mounting bracket having a first side and a second side;

b. a first recessed area formed in the mounting bracket first side;

c. a second recessed area formed in the mounting bracket second side; and d. an elongated cylindrical shaft that is rotatably received in the first and second recessed areas;

wherein the one or more catches are coupled to the cylindrical shaft, and the handle is coupled to the cylindrical shaft intermediate the bracket first side and the bracket second side.

15. The animal cage of claim 14, wherein the one or more catches is integrally formed with the cylindrical shaft by bending an end of the elongated shaft to form a hook.

16. The animal cage of claim 14, wherein when the handle is in the first locked position, the one or more catches is positioned intermediate two adjacent horizontal and two adjacent vertical bars that form the one panel to which the first door or second door is coupled.

17. An animal cage comprising:

a. a front panel, a rear panel, a first side panel, a second side panel, a top panel, and a bottom panel;

b. a first door operatively coupled to one of the front panel, rear panel, first side panel, second side panel or top panel; and c. at least one latch coupled to the one of the front panel, rear panel, first side panel, second side panel or top panel to which the first door is coupled, wherein:

each of the front panel, rear panel, first side panel, and second side panel are formed from a plurality of horizontal bars and a plurality of vertical bars;

the first door is both pivotally and slidably coupled to the one panel to which the first door is coupled along a first side edge of the first door;

the first door comprises at least one opening formed in a second side edge of the first door;

the first door is moveable between:

a first closed position in which the at least one latch does not align with the at least one opening formed in the second side edge of the first door and the first door will not rotate with respect to the one panel to which it is coupled;

a second intermediate position in which the at least one latch aligns with the at least one opening formed in the second side edge of the first door; and a third open position in which the first door is in an open position d. a second door slidably coupled to the one panel to which the second door is coupled such that the second door is horizontally slidable between a first closed position and a second open position along at least one horizontal bar extending from one edge to an opposite edge of the one panel to which the second door is coupled.

18. The animal cage of claim 17, wherein:

a. the first door is slidable between the first closed position and the second intermediate position; and b. the first door is rotatable between the second intermediate position and the third open position.

19. The animal cage of claim 17, further comprising an integrated handle and lock mechanism coupled to the first door; wherein the integrated handle and lock mechanism is rotatable between:

a. a first locked position in which:

the handle is substantially parallel to a surface defined by the first door; and one or more catches engage with at least one of the horizontal bars or at least one of the vertical bars that form the one panel to which the first door is coupled; and b. a second unlocked position in which:

the handle is no longer parallel to the surface defined by the first door;

the one or more catches disengage from the at least one of the horizontal bars or the at least one of the vertical bars that form the one panel to which the first door is coupled.

* * * * *